July 14, 1925.

L. MATHES 1,546,301

PARAFFIN ATTACHMENT FOR WINDERS

Filed July 11, 1923

Louis Mathes
INVENTOR

BY Victor J. Evans
ATTORNEY

WITNESS:

Patented July 14, 1925.

1,546,301

UNITED STATES PATENT OFFICE.

LOUIS MATHES, OF PHILADELPHIA, PENNSYLVANIA.

PARAFFIN ATTACHMENT FOR WINDERS.

Application filed July 11, 1923. Serial No. 650,933.

*To all whom it may concern:*

Be it known that I, LOUIS MATHES, a citizen of the United States, residing at Philadelphia, in the county of Philadelphia and State of Pennsylvania, have invented new and useful Improvements in Paraffin Attachments for Winders, of which the following is a specification.

This invention relates to thread waxing devices for winding machines, and the principal object is to produce a device of this nature which shall operate efficiently and effectively.

With these and other objects in view, the invention resides in certain novel features of construction and combination and arrangement of parts, the essential features of which are hereinafter fully described, are particularly pointed out in the appended claims, and are illustrated in the accompanying drawings, in which:—

Like characters of reference refer to like parts in all views.

Figure 1:
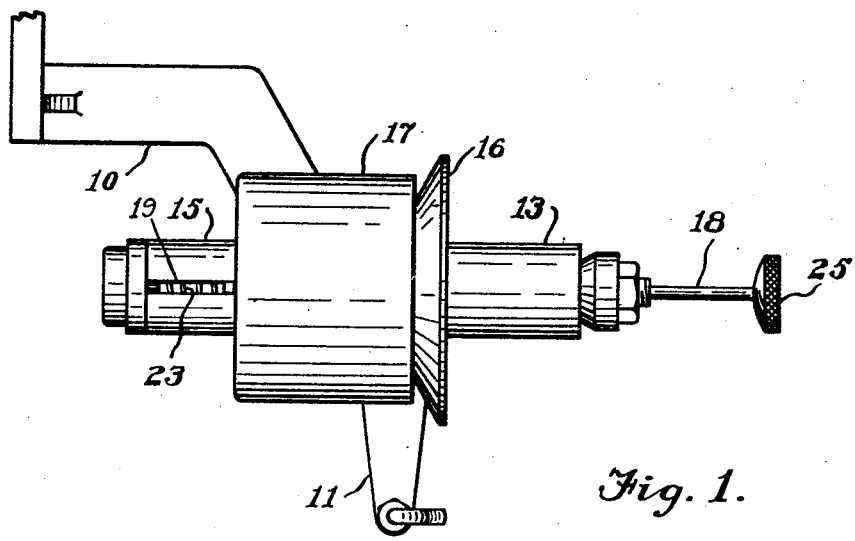
Figure 1 is a top plan view of my improved waxing device.
Figure 2:
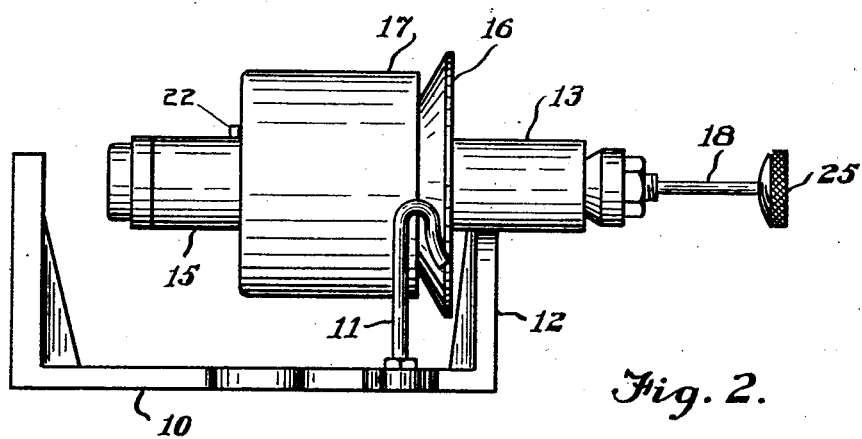
Figure 2 is a front elevation of the same.
Figure 3:
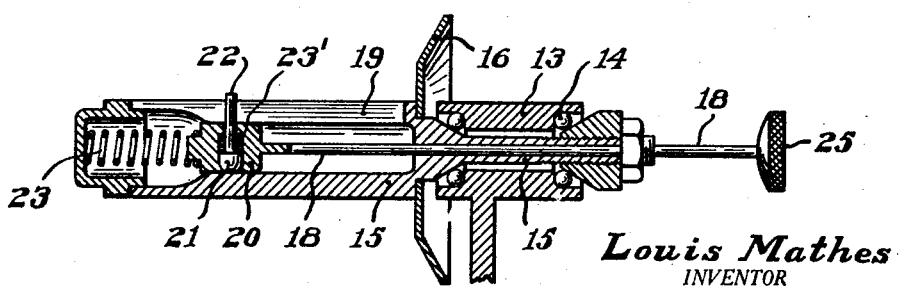
Figure 3 is a section taken along the axis of the spindle.

Referring to the drawing in detail, 10 represents a bracket which may be provided with any suitable means as at 11 for guiding the thread or yarn. This bracket is extended upwardly at 12 and provided with a boss 13 in which are arranged ball bearings 14 on which runs a spindle 15. The spindle is formed at one side of the boss 13 with a disc 16 against which the wax indicated at 17 is constantly forced, the disc 16 being dished so as to form a groove for carrying the thread. The spindle 15 is apertured at one side of the disc so as to form a bearing for a rod 18, and is formed with a slot 19 at the other side of the disc.

The rod 18 is formed with an enlarged inner end 20 having a transverse way through it in which there rides a plunger having an enlarged end 21 and a small flattened end 22. A spring 23 tends constantly to extrude the enlarged end 21 of the plunger. A spring 23 tends constantly to force the entire rod 18 and connected parts toward the disc, the flattened portion 22 riding in the slot 19.

The inside of the spindle 15 is formed with a lesser internal diameter near the disc 16 and with an enlarged internal diameter or bore near its upper end so that the enlarged plunger end 21 in riding along the interior surface of the spindle forces the flattened portion 22 through the slot 19 and allows its withdrawing when the rod 18 is moved by its finger-piece 25 so as to bring the plunger portion 21 in co-operative relation with the enlarged bore at the upper end of the spindle.

It will now be seen that by the means above described, when it is desired to place the block of wax 17 on the spindle, the operator first presses the finger-piece 25 inwardly whereby the member 21 moves along the slot and towards the axis of the spindle. This leaves the surface of the spindle free so that the wax can be slipped to position thereon. Upon now releasing the rod, the same moves back and the element 21 is extruded through the slot and moved therealong until it comes in contact with the block of wax. During the further operations of the machine, the wax will be fed up by the constant tension of the spring.

While I have described what I deem to be the most desirable embodiment of my invention, it is obvious that many of the parts may be varied without in any way departing from the spirit of my invention, and I therefore do not limit myself to the exact details of construction herein shown nor to anything less than the whole of my invention limited only by the appended claims.

What I claim is:—

1. In a device of the class described, the combination of a slotted and apertured spindle formed with varying internal diameters, a block of wax on said spindle, a rod in said spindle, a spring pressed plunger on said rod, resilient means for moving said rod in one direction and means on said plunger and extending through said slot for urging engagement with said block of wax.

2. In a device of the class described, the combination of a slotted and apertured spindle formed with varying internal diameters. a block of wax on said spindle, a rod in said spindle, a spring pressed plunger on said rod, resilient means for moving said rod in one direction, means carried by said plunger and extending through said slot for engagement with the wax to move the wax upon movement of the rod, and manipulative means for moving said rod in the opposite direction.

3. In a device of the class described, the combination of a rotatable apertured wax carrying spindle, a spring pressed rod mounted therein, a block of wax on said spindle, and a spring pressed wax feeding plunger carried on said rod for engagement with said block of wax.

4. In a device of the class described, the combination of an apertured wax carrying spindle, rotatably mounted and formed with a longitudinal slot, a spring pressed rod therein, a block of wax on said spindle, a spring pressed plunger carried on said rod and formed with a wax engaging element extending through the slot of the spindle and engaging said block of wax.

5. In a device of the class described, the combination of an apertured wax carrying spindle rotatably mounted and provided with a longitudinal slot, a spring pressed rod therein, a block of wax on said spindle, and a spring pressed plunger on said rod and formed with a wax engaging element extending through the slot of said spindle, and engaging said block of wax.

6. In a device of the class described, the combination of a rotatable wax carrying spindle, a block of wax thereon, a frustro-conical disc on said spindle, a plunger slidable within said spindle, said spindle provided with a slot, means carried by said plunger and extending through said slot for engagement with said block of wax to urge it against said disc, and an urging spring engaging said plunger.

7. In a device of the class described, the combination of a rotatable wax carrying spindle, a block of wax thereon, a frustro-conical disc on said spindle, a plunger slidable within said spindle, said spindle provided with a slot, a spring pressed pin carried by said plunger and extending through said slot for engagement with the block of wax to urge it against said disc, an urging spring engaging said plunger, and a finger-piece connected to the plunger for moving it against the action of said spring.

In testimony whereof I affix my signature.

LOUIS MATHES.